US009109666B1

(12) United States Patent
Gauthier (10) Patent No.: US 9,109,666 B1
(45) Date of Patent: Aug. 18, 2015

(54) DUAL RATIO CONSTANT MESH GEARBOX (71) Applicant: Atieva, Inc., Redwood City, CA (US)

(72) Inventor: Jean-Philippe Gauthier, San Francisco, CA (US)

(73) Assignee: ATIEVA, INC., Menlo Park, CA (US)

( * ) Notice: Subject to any disclaimer, the term of this patent is extended or adjusted under 35 U.S.C. 154(b) by 0 days.

(21) Appl. No.: 14/273,667

(22) Filed: May 9, 2014

(51) Int. Cl.
*F16H 3/54* (2006.01)
*F16H 61/02* (2006.01)
*F16H 61/686* (2006.01)

(52) U.S. Cl.
CPC .............. *F16H 3/54* (2013.01); *F16H 61/0213* (2013.01); *F16H 61/686* (2013.01); *F16H 2061/0232* (2013.01); *F16H 2200/0021* (2013.01); *F16H 2200/0034* (2013.01); *F16H 2200/2005* (2013.01); *F16H 2200/2033* (2013.01); *F16H 2200/2082* (2013.01)

(58) Field of Classification Search
CPC ................ F16H 2200/0021; F16H 2200/0034; F16H 3/54; F16H 2200/2033; F16H 2200/2082

USPC .................................................... 475/318, 320
See application file for complete search history.

(56) References Cited

U.S. PATENT DOCUMENTS

| 1,041,047 | A | * | 10/1912 | Hewitt | 475/318 |
|---|---|---|---|---|---|
| 2,007,304 | A | * | 7/1935 | Padgett | 475/262 |
| 4,800,782 | A | * | 1/1989 | Sivalingam | 475/318 |
| 8,469,855 | B2 | * | 6/2013 | Phillips | 475/293 |
| 2004/0242369 | A1 | * | 12/2004 | Alfredsson | 475/320 |
| 2014/0274528 | A1 | * | 9/2014 | Valente et al. | 475/150 |
| 2015/0158382 | A1 | * | 6/2015 | Mordukhovich et al. | 475/320 |

* cited by examiner

*Primary Examiner* — Sherry Estremsky
(74) *Attorney, Agent, or Firm* — Patent Law Office of David G. Beck (57) ABSTRACT

A dual ratio constant-mesh gearbox is provided that is suitable for use with an automobile, and particularly well-suited for an electric vehicle. The gearbox, which may be configured either as a manual or automatic gearbox, utilizes a planetary gear set and a pair of clutches to shift between under drive and direct drive modes.

20 Claims, 7 Drawing Sheets

DUAL RATIO CONSTANT MESH GEARBOX

FIELD OF THE INVENTION

The present invention relates generally to a vehicle and, more particularly, to a dual speed gearbox suitable for use with an electric motor.

BACKGROUND OF THE INVENTION

In a typical electric vehicle a single speed gearbox is used between the traction motor and the differential. The ability to use a single speed gearbox rather than the multi-speed gearbox required in a conventional vehicle is the result of the wide useful operating range, both in terms of power and torque, of an electric motor versus that of an internal combustion engine.

While a single speed gearbox may be used with an electric vehicle, its use is not without drawbacks. For example, because of the maximum speed limit of the motor and the requirement in a high performance car to reach a certain top speed, the gear ratio is typically chosen to be longer than what would be optimal to provide crisp initial acceleration from a standstill. Additionally, due to torque ripple and vibrations, motor torque may be limited at very low rotating speeds. As a result, initial acceleration from a standstill in a typical electric vehicle is typically more sluggish than what would be expected given the drivetrain's characteristics.

Accordingly, what is needed is a dual speed gearbox that may be optimized for the operating characteristics of an electric motor, thereby providing the desired level of performance throughout the vehicle's operating range. The present invention provides such a dual speed gearbox.

SUMMARY OF THE INVENTION

The present invention provides a dual ratio constant-mesh gearbox suitable for use with an automobile, and in particular suited for an electric vehicle. The gearbox is comprised of (i) a housing, (ii) an input drive shaft at least partially contained within the housing, where the input drive shaft is coupled to the vehicle's propulsion electric motor, (iii) an externally toothed sun gear rigidly coupled to the input drive shaft, (iv) a planetary lockup plate rigidly coupled to the sun gear, (v) an internally toothed ring gear, (vi) a set of planetary gears interposed between the sun and ring gears, where the set of planetary gears are in constant mesh with both the sun and ring gears, (vii) a planetary gear carrier coupled to the set of planetary gears and to an output drive shaft, where the output drive shaft is at least partially contained within the housing, (viii) a sprag clutch assembly contained within the housing, where the sprag clutch permits rotation of the ring gear in a first direction while preventing rotation of the ring gear in a second direction, and (ix) a clutch member corresponding to a second clutch, where the second clutch is separate from and independent of the sprag clutch assembly, where the clutch member is translatable from at least a first position to a second position, where a first surface of the clutch member is in contact with the planetary lockup plate and locks the ring gear to the sun gear when the clutch member is located in the first position, and where the first surface of the clutch member is no longer in contact with the planetary lockup plate and the ring gear is unlocked from the sun gear when the clutch member is located in the second position. The sprag clutch assembly may be interposed between an internal housing surface and a ring gear carrier, where the ring gear is rigidly coupled to the ring gear carrier. The clutch member may be comprised of a cone-friction clutch member. The dual ratio constant-mesh gearbox may further include a spring that biases the clutch member towards the first position.

In one aspect, a clutch control member is coupled to the clutch member, the clutch control member translating the clutch member between at least the first and second positions. A positioning motor may be coupled to the clutch control member.

In another aspect, the gearbox operates in a direct drive mode when the clutch member is located in the first position and the ring gear is locked to the sun gear, resulting in the sun gear, the ring gear and the set of planetary gears rotating within the housing as a single unit and causing the input drive shaft to be directly coupled to the output drive shaft and for the two drive shafts to rotate at the same rate.

In another aspect, the gearbox operates in an under drive mode when the clutch member is located in a third position. When the clutch member is in the third position, the clutch member's first surface is no longer in contact with the planetary lockup plate, and the ring gear is unlocked from the sun gear and locked to the housing. As a result, when reverse input torque is applied to the input drive shaft a reaction torque is generated on the ring gear in the first direction. While rotation of the ring gear in the first direction is permitted by the sprag clutch assembly, ring gear rotation is prevented by the clutch member locking the ring gear to the housing, thereby causing reverse vehicle torque to be applied to the vehicle's wheel(s) when reverse input torque is applied to the input drive shaft. Note that the same clutch member position may correspond to the second and third positions.

In another aspect, the gearbox operates in an under drive mode when the clutch member is located in the second position and the ring gear is unlocked from the sun gear. In this mode, forward input torque applied to the input drive shaft generates a reaction torque on the ring gear in the second direction, where rotation of the ring gear in the second direction is prevented by the sprag clutch assembly. As a result, forward input torque applied to the input drive shaft causes forward vehicle torque to be applied to the vehicle's wheel(s) via the planetary gear carrier and the output drive shaft.

In another aspect, a controller coupled to the vehicle's propulsion motor is also coupled to a motor speed sensor and an output drive shaft speed sensor. When a downshift from the direct drive mode to the under drive mode is initiated, the controller is configured to increase the motor's speed based on the current output drive shaft speed and the under drive gear ratio.

In another aspect, a controller coupled to the vehicle's propulsion motor is also coupled to a motor speed sensor and an output drive shaft speed sensor. When an upshift from the under drive mode to the direct drive mode is initiated, the controller is configured to decrease the motor's speed based on the current output drive shaft speed and the under drive gear ratio.

In another aspect, a clutch control member is coupled to the clutch member, the clutch control member translating the clutch member between at least the first and second positions. A positioning motor, which is coupled to the clutch control member, controls the motion of the clutch control member. A controller, coupled to the vehicle's propulsion motor, the positioning motor, and a motor speed sensor, is configured to automatically upshift from the under drive mode to the direct drive mode and to automatically downshift from the direct drive mode to the under drive mode based on current motor speed and a set of preprogrammed shift instructions. Additionally, an output drive shaft speed sensor may be coupled to the controller such that the controller automatically upshifts from the under drive mode to the direct drive mode and automatically downshifts from the direct drive mode to the under drive mode based on current output drive shaft speed and the set of preprogrammed shift instructions. A spring may be included that biases the clutch member towards the first position. The gearbox operates in the direct drive mode when the clutch member is located in the first position and the ring gear is locked to the sun gear, and operates in the under drive mode when the clutch member is located in the second position and the ring gear is unlocked from the sun gear. The gearbox may include a drive mode selector switch for selecting among a plurality of selectable drive modes, where each selectable drive mode corresponds to one of a plurality of shift instruction subsets, and where the set of preprogrammed shift instructions is comprised of the plurality of shift instruction subsets. The gearbox may include a drive mode over-ride switch, where activation of the drive mode over-ride switch alters the set of preprogrammed shift instructions, for example forcing the gearbox to remain within the direct drive mode.

In another aspect, a clutch control member is coupled to the clutch member, the clutch control member translating the clutch member between at least the first and second positions. A positioning motor, which is coupled to the clutch control member, controls the motion of the clutch control member. A controller is coupled to the vehicle's propulsion motor and the positioning motor. The gearbox includes (i) a user selectable under drive mode selector switch which, when selected, causes the controller to shift into the under drive mode, and (ii) a user selectable direct drive mode selector switch which, when selected, causes the controller to shift into the direct drive mode.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

Figure 1:
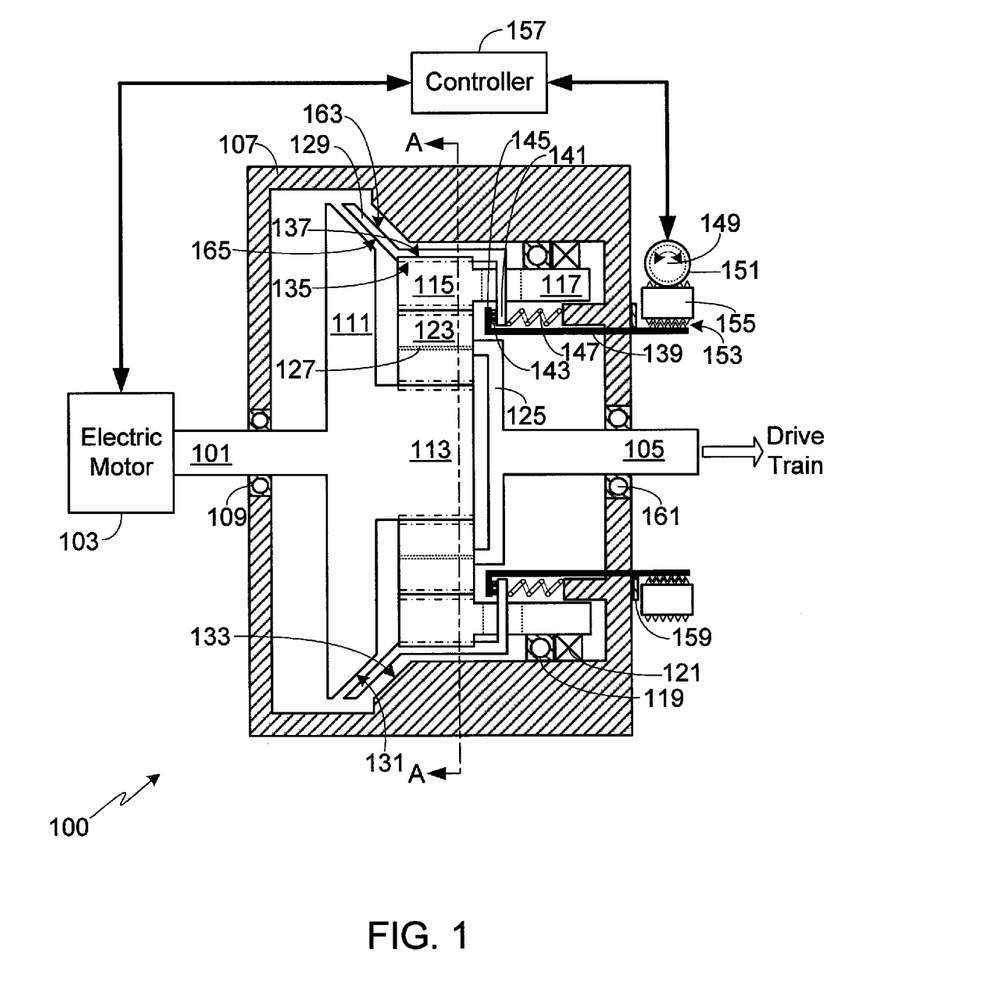
FIG. 1 provides a cross-sectional view of a dual ratio gearbox in accordance with the invention.

The gearbox described and illustrated herein is generally designed for use with devices requiring a two-speed transmission, and more specifically, for a vehicle using an electric motor, e.g., an electric vehicle (EV). As shown in FIG. 1, input drive shaft 101 of gearbox 100 is coupled to the vehicle's electric motor 103 while output shaft 105 is coupled to one or more wheels of the vehicle. Although output shaft 105 may be coupled directly to the vehicle's wheels, preferably it is coupled via a differential, not shown, to the wheels.

Input drive shaft 101 passes into gearbox housing 107 through bearing 109. Coupled to input shaft 101 is a planetary lockup plate 111 and sun gear 113. In at least one embodiment, shaft 101, planetary lockup plate 111 and sun gear 113 are fabricated as a single component, i.e., from a single piece of stock. A ring gear 115 is coupled to a ring gear carrier 117. Preferably ring gear 115 and ring gear carrier 117 are fabricated as a single component, i.e., from a single piece of stock. Bearing 119 is interposed between a bearing mounting surface, e.g., an internal gearbox housing surface as shown, and ring gear carrier 117. A sprag clutch assembly 121 allows ring gear carrier 117, and thus ring gear 115, to only rotate in a single direction within housing 107. As described in detail below, sprag clutch assembly 121 allows the forward driving torque output of gearbox 100 to be adjusted regardless of whether the gearbox is operating in the indirect or direct drive mode, while only allowing reverse driving torque output when the gearbox is in the indirect drive mode.

Figure 2:
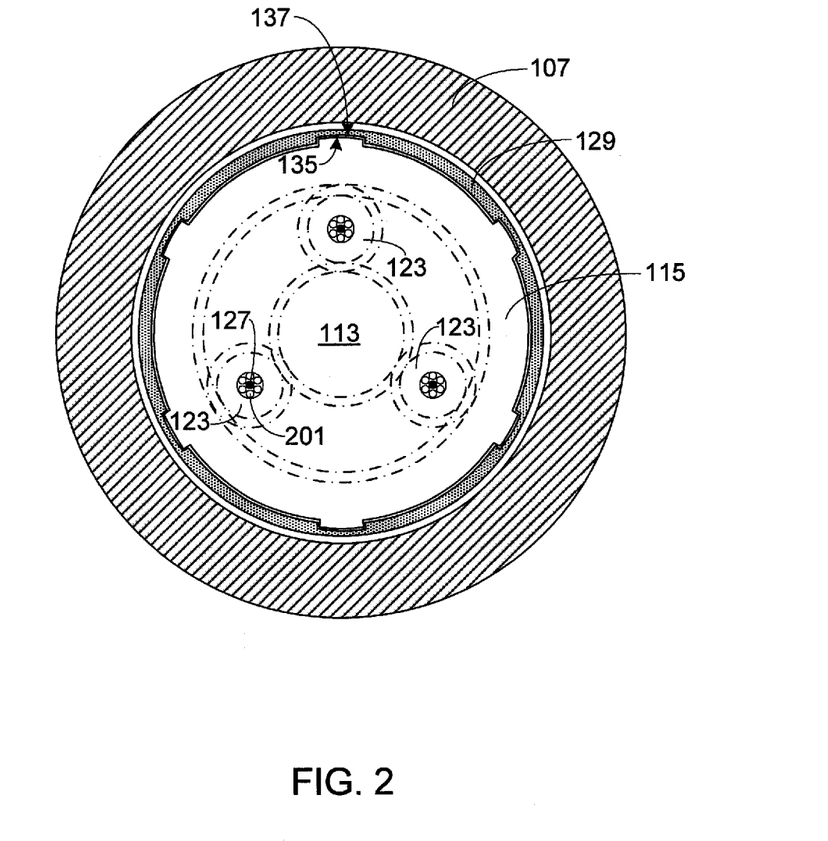
FIG. 2 provides a cross-sectional view of the gear assembly taken along plane A-A of FIG. 1.

Interposed between ring gear 115 and sun gear 113, and in constant mesh with ring gear 115 and sun gear 113, are planetary gears 123. A planetary gear carrier 125 is coupled to each of the planetary gears 123 via bearings 201 and pins 127. A cross-sectional view of the gear assembly, taken along plane A-A, is shown in FIG. 2. Note that for clarity, the individual gear teeth of sun gear 113, planetary gears 123 and ring gear 115 are not shown.

As described in detail below, a cone-friction clutch member 129 is integral to the drive selection system. In FIG. 1, the cone-shaped portion of member 129 is shown located at an intermediary position between surface 131 of planetary lockup plate 111 and housing surface 133. Splines 135, which are fabricated into the outer circumference of ring gear 115, slide within grooves 137 of clutch member 129. The location of the cone-shaped portion of member 129 is determined by clutch control member 139. As illustrated, in the preferred embodiment control member 139 applies pressure to portion 141 of clutch member 129. Preferably a bearing assembly 143 is interposed between surface 145 of control member 139 and portion 141 of clutch member 129. A spring 147 applies pressure to the other side of portion 141 of clutch member 129. The location of member 139 is controlled by a positioning motor 149. In the preferred embodiment, a pinion gear 151 is coupled to motor 149. Pinion gear 151 is coupled to the teeth 153 on control member 139 via gear 155. Operation of positioning motor 149 is controlled by motor controller 157. Preferably motor controller 157 is also coupled to, and controls, vehicle drive motor 103. In the view shown in FIG. 1, a needle thrust bearing 159 is shown as well as output shaft bearing 161.

Under Drive Mode—Forward Vehicle Travel

Figure 3:
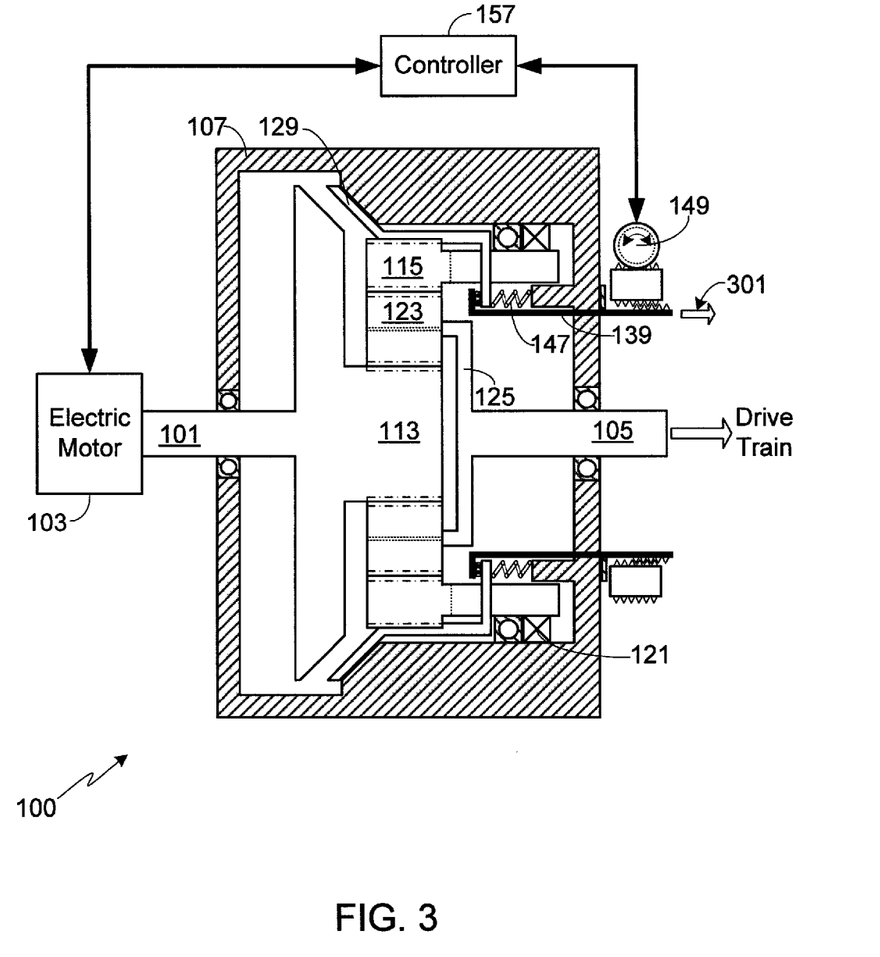
FIG. 3 provides a view of the dual ratio gearbox of FIGS. 1 and 2, configured to provide under drive, reverse torque to the wheels of the vehicle.

In order to achieve forward vehicle motion with the gearbox in under drive, the cone-shaped portion of member 129 is located at an intermediary position between surface 131 of planetary lockup plate 111 and housing surface 133 as illustrated in FIG. 1, or placed into contact with surface 133 of transmission housing 107 as illustrated in FIG. 3. On forward torque transmission, the input torque applied by motor 103 to input drive shaft 101, and thus to sun gear 113, generates a reaction torque on ring gear 115 in the direction that is locked by sprag clutch assembly 121. As a result, forward torque is transmitted to the wheels of the vehicle by planetary gear carrier 125 and output drive shaft 105.

Under Drive Mode—Reverse Vehicle Travel

When the vehicle is placed into reverse, positioning motor 149 moves control member 139 in the direction 301 as illustrated in FIG. 3. This movement compresses spring 147 and forces surface 163 of member 129 into contact with surface 133 of transmission housing 107. Then when the input torque applied by motor 103 to input drive shaft 101 and sun gear 113 is reversed, ring gear 115 is locked into position against housing 107 and reverse torque is transmitted to the wheels of the vehicle by planetary gear carrier 125 and output drive shaft 105. Therefore in reverse, rather than using sprag clutch assembly 121 to lockup ring gear 115, clutch member 129 locks the ring gear into place. As a result of this configuration, both forward and reverse torque can be applied to the vehicle's wheels when gearbox 100 is operating in the under drive mode.

Direct Drive Mode—Forward Vehicle Travel

Figure 4:
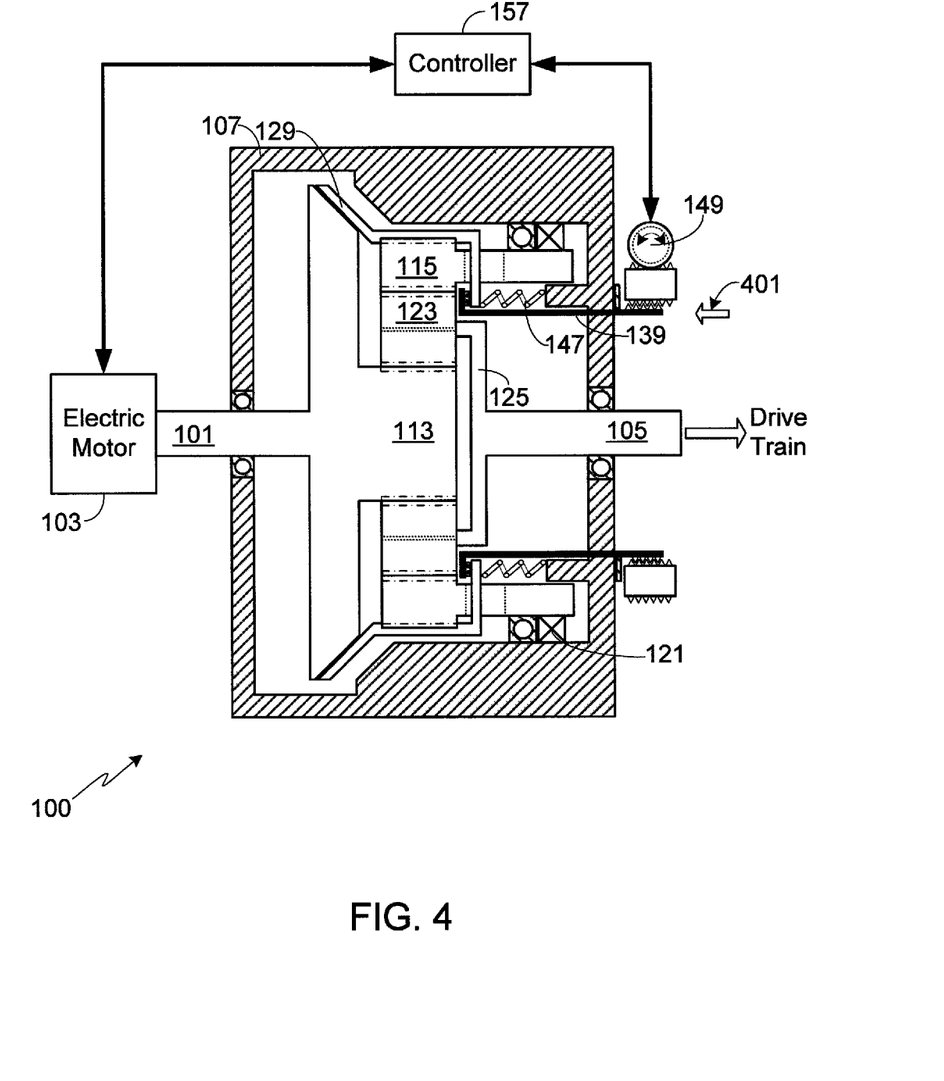
FIG. 4 provides a view of the dual ratio gearbox of FIGS. 1-3, configured to provide direct drive torque to the wheels of the vehicle.

In order to achieve forward vehicle motion with the gearbox in direct drive, positioning motor 149 moves control member 139 in the direction 401 as illustrated in FIG. 4. Member 129, under the force of return spring 147, is then pressed against planetary lockup plate 111 and, more specifically, surface 165 of member 129 is forced against surface 131 of planetary lockup plate 111. As a result, ring gear 115 is locked to sun gear 113 and the entire planetary gear assembly, i.e., gears 113, 115 and 123 will turn as a single unit. As long as ring gear 115 is rotating in the forward direction, sprag clutch assembly 121 permits motor 103 to apply either forward or reverse torque to input drive shaft 101.

During acceleration, shifting from under drive to direct drive using gearbox 100 is very smooth. As described above, when the gearbox is in the under drive mode and forward torque is being applied, sprag clutch assembly 121 prevents ring gear 115 from rotating. While shifting to direct drive using clutch 129, the sprag clutch 121 continues to insure that the input torque applied by motor 103 generates forward torque applied to the wheels. Once surface 165 of clutch member 129 comes into contact with surface 131 of planetary lockup plate 111, clutch member 129 and lockup plate 111 enter a friction zone that shifts the system smoothly towards the direct drive mode. The shift to direct drive is completed once clutch member 129 and lockup plate 111 are synchronized.

When gearbox 100 downshifts from direct drive to under drive while the car is accelerating, controller 157 allows clutch 129 to slip while bringing motor 103 up to the necessary speed for the under drive gear ratio. Preferably controller 157 monitors both motor speed using sensor 501 and output drive shaft speed using sensor 503 (see FIG. 5), thus allowing controller 157 to quickly and efficiently increase the speed of motor 103 based on the under drive gear ratio and the current vehicle speed.

Figure 5:
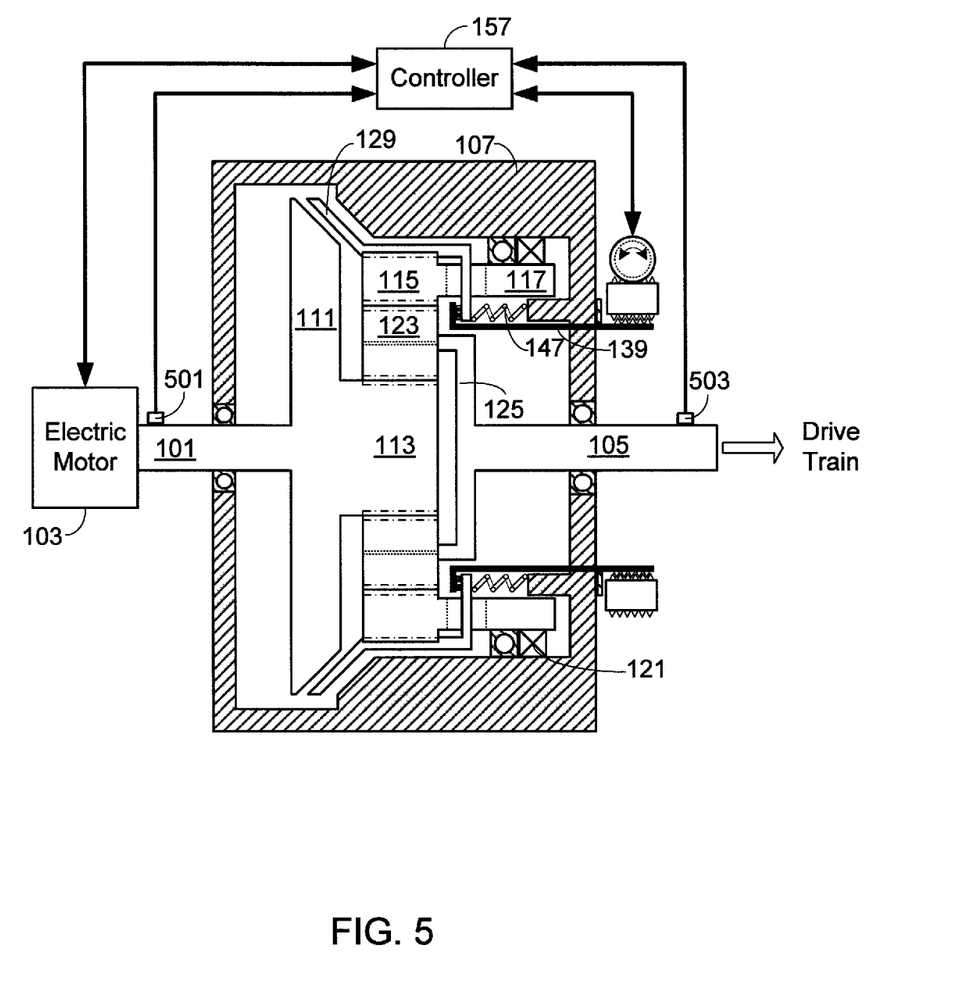
FIG. 5 provides a view of the dual ratio gearbox of FIGS. 1-4, with the inclusion of sensors to monitor input and output drive shaft speed.

While coasting, when gearbox 100 shifts from under drive to direct drive the change in rotational speed of motor 103 may lead to lurching or shuddering as surface 165 of clutch member 129 comes into contact with surface 131 of planetary lockup plate 111, and before the clutch member 129 and lockup plate 111 are synchronized. Drive train shuddering may be aggravated during this period if motor 103 undershoots the desired motor speed. Accordingly, in at least one preferred embodiment controller 157 monitors both motor speed and output drive shaft speed using sensors 501 and 503 as illustrated in FIG. 5. By monitoring both the motor speed and the output drive shaft speed, when the shift from under drive to direct drive is initiated, controller 157 is able to quickly and efficiently lower the speed of motor 103 to match that of the output drive shaft, thereby minimizing motor speed mismatch and preventing undershoot. Similarly, downshifting from direct drive to under drive requires controller 157 to quickly and efficiently increase the speed of motor 103 in order to minimize mismatch and the shuddering that can accompany such mismatch.

Figure 6:
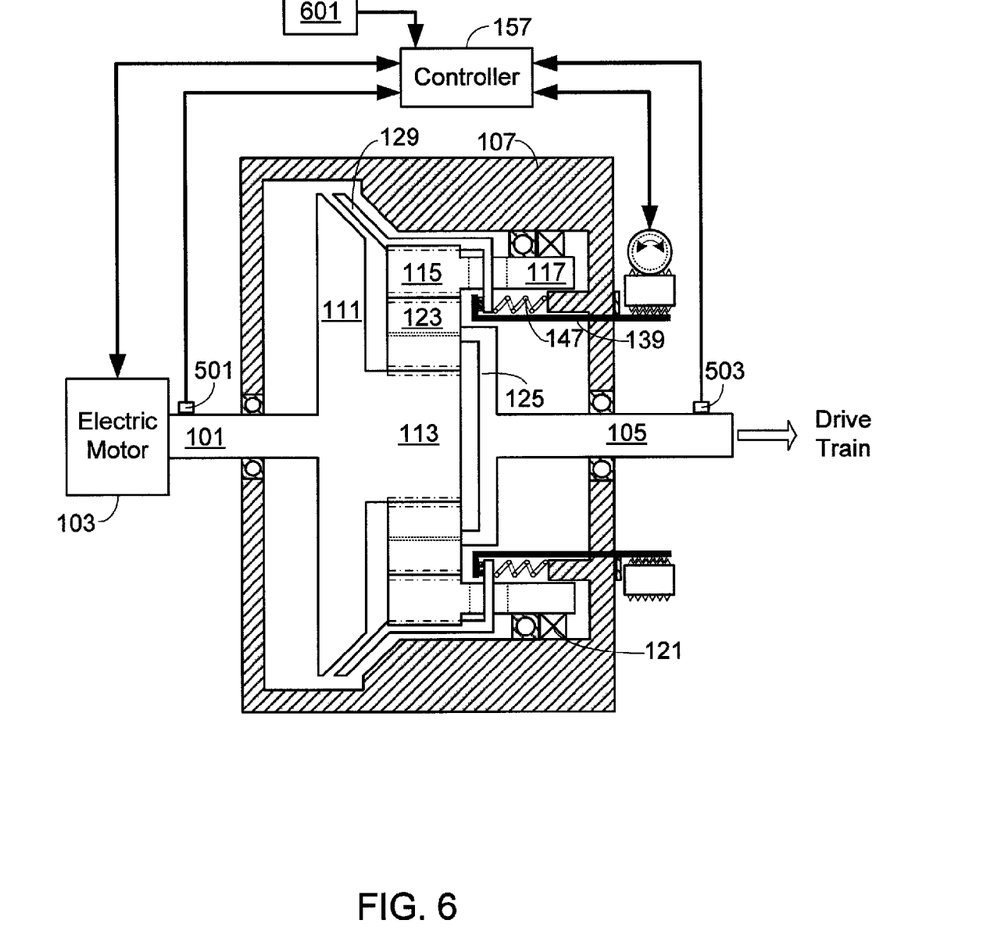
FIG. 6 provides a view of the dual ratio gearbox of FIG. 5, with the inclusion of a drive mode over-ride sensor.

In a typical configuration, shifting between under drive and direct drive is automatic and performed in accordance with a set of preprogrammed instructions that are either incorporated into controller 157 or input into a separate processor that is coupled to controller 157. Shifting is preferably based on motor speed, as monitored by sensor 501, although other characteristics such as vehicle speed may be used to determine when to shift between drive modes. Additionally in at least one embodiment of an automatic gearbox, and as illustrated in FIG. 6, the shift points between under drive and direct drive may be altered based on the input of switch 601. Switch 601 may monitor accelerator pedal movement, thus allowing the driver to alter shifting characteristics based on how rapidly and/or how far the accelerator pedal is depressed. Alternately, switch 601 may be a drive mode selector that allows the user to vary the drive mode, and thus the shifting characteristics, between multiple modes (e.g., sport, normal and efficiency).

Many drivers find it difficult to drive over hilly terrain. Such terrain is especially problematic when coupled with the stop and go traffic conditions associated with driving in the city. Under these conditions, accelerating away from a stop when the stop is on an uphill incline often leads to at least some backwards vehicle roll, which may make the driver nervous as well as potentially causing a minor collision if the vehicle rolls backwards and hits the car behind it. Accordingly, in one embodiment of the invention switch 601 is associated with a gearbox over-ride function. When selected, the gearbox remains in direct drive regardless of motor and/or vehicle speed. Although selecting this feature reduces acceleration from a dead stop, due to the locking effect of sprag clutch assembly 121, the car will not roll backwards when the brake is released, even when stopped on a steep incline. In an alternate embodiment, switch 601 monitors vehicle inclination and automatically switches the gearbox, via controller 157, to direct drive when the car is stopped on an uphill incline greater than a preset angle.

Figure 7:
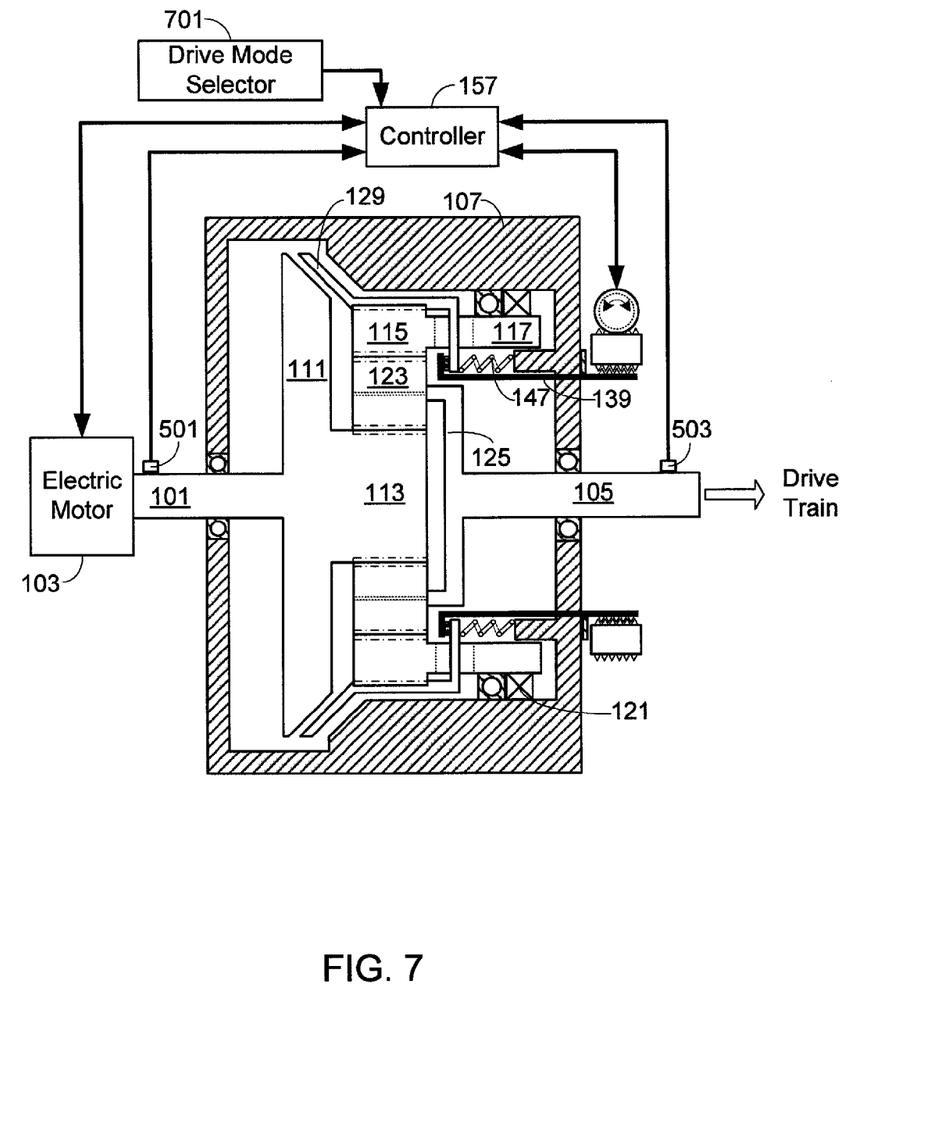
FIG. 7 provides a view of the dual ratio gearbox of FIG. 5 configured for manual drive selection.

In an alternate embodiment illustrated in FIG. 7, the dual ratio gearbox of the invention is configured to be used as a manual gearbox. In this configuration controller 157 is coupled to a drive mode selector 701, where the drive mode selector 701 determines when to shift between under drive and direct drive. Drive mode selector 701 may be designed to look like a typical gear shift selector; alternately, drive mode selector 701 may be comprised of a button, toggle or other switching means mounted on the dash, central console or steering wheel; alternately, drive mode selector 701 may be comprised of a button or lever mounted to the floor, thus allowing the driver to shift gears by depressing or otherwise engaging the floor mounted switch means.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A dual ratio constant-mesh gearbox, comprising:
a housing;
an input drive shaft at least partially contained within said housing, wherein said input drive shaft is coupled to a vehicle propulsion electric motor;
a sun gear rigidly coupled to said input drive shaft;
a planetary lockup plate rigidly coupled to said sun gear;
a ring gear;
a set of planetary gears interposed between said sun gear and said ring gear, wherein said set of planetary gears are in constant mesh with said sun gear and said ring gear;
a planetary gear carrier coupled to said set of planetary gears and to an output drive shaft, wherein said output drive shaft is at least partially contained within said housing;
a sprag clutch assembly contained within said housing, wherein said sprag clutch assembly permits rotation of said ring gear in a first direction and prevents rotation of said ring gear in a second direction; and
a clutch member corresponding to a second clutch, wherein said second clutch is separate from and independent of said sprag clutch assembly, wherein said clutch member is translatable from at least a first position to a second position, wherein a first surface of said clutch member is in contact with said planetary lockup plate and locks said ring gear to said sun gear when said clutch member is located in said first position, and wherein when said clutch member is located in said second position said ring gear is unlocked from said sun gear and said first surface of said clutch member is no longer in contact with said planetary lockup plate.

2. The dual ratio constant-mesh gearbox of claim 1, said clutch member comprising a cone-friction clutch member.

3. The dual ratio constant-mesh gearbox of claim 1, further comprising a spring, wherein said spring biases said clutch member towards said first position.

4. The dual ratio constant-mesh gearbox of claim 1, further comprising a clutch control member coupled to said clutch member, wherein said clutch control member translates said clutch member between said first and second positions.

5. The dual ratio constant-mesh gearbox of claim 4, further comprising a positioning motor coupled to said clutch control member, wherein said positioning motor controls a clutch control member position.

6. The dual ratio constant-mesh gearbox of claim 1, further comprising a ring gear carrier rigidly coupled to said ring gear, wherein said sprag clutch assembly is interposed between an internal surface of said housing and said ring gear carrier.

7. The dual ratio constant-mesh gearbox of claim 1, wherein said dual ratio constant-mesh gearbox operates in a direct drive mode when said clutch member is located in said first position and said ring gear is locked to said sun gear, wherein said sun gear and said set of planetary gears and said ring gear rotate within said housing as a single unit when said ring gear is locked to said sun gear, and wherein said input drive shaft is directly coupled to said output drive shaft causing said input and output drive shafts to rotate at the same rate when said ring gear is locked to said sun gear.

8. The dual ratio constant-mesh gearbox of claim 1, wherein said dual ratio constant-mesh gearbox operates in an under drive mode when said clutch member is located in a third position, wherein when said clutch member is located in said third position said ring gear is unlocked from said sun gear and said first surface of said clutch member is no longer in contact with said planetary lockup plate, wherein when said clutch member is located in said third position said ring gear is locked to said housing, wherein reverse input torque applied by said vehicle propulsion electric motor to said input drive shaft generates a reaction torque on said ring gear in said first direction, wherein rotation of said ring gear in said first direction is permitted by said sprag clutch, and wherein rotation of said ring gear in said first direction is prevented by said clutch member in said third position thereby causing reverse vehicle torque to be applied to at least one vehicle wheel by said planetary gear carrier and said output drive shaft.

9. The dual ratio constant-mesh gearbox of claim 8, wherein said third position of said clutch member is equivalent to said second position of said clutch member.

10. The dual ratio constant-mesh gearbox of claim 1, wherein said dual ratio constant-mesh gearbox operates in an under drive mode when said clutch member is located in said second position and said ring gear is unlocked from said sun gear, wherein forward input torque applied by said vehicle propulsion electric motor to said input drive shaft generates a reaction torque on said ring gear in said second direction, wherein rotation of said ring gear in said second direction is prevented by said sprag clutch assembly causing forward vehicle torque to be applied to at least one vehicle wheel by said planetary gear carrier and said output drive shaft.

11. The dual ratio constant-mesh gearbox of claim 1, further comprising a controller coupled to said vehicle propulsion electric motor, a motor speed sensor coupled to said controller, and an output drive shaft speed sensor coupled to said controller, wherein upon an initiation of a downshift from a direct drive mode to an under drive mode said controller is configured to increase a motor speed corresponding to said vehicle propulsion electric motor based on a current output drive shaft speed and an under drive gear ratio.

12. The dual ratio constant-mesh gearbox of claim 1, further comprising a controller coupled to said vehicle propulsion electric motor, a motor speed sensor coupled to said controller, and an output drive shaft speed sensor coupled to said controller, wherein upon an initiation of an upshift from an under drive mode to a direct drive mode said controller is configured to decrease a motor speed corresponding to said vehicle propulsion electric motor based on a current output drive shaft speed.

13. The dual ratio constant-mesh gearbox of claim 1, further comprising:
   a clutch control member coupled to said clutch member, wherein said clutch control member translates said clutch member between said first and second positions;
   a positioning motor coupled to said clutch control member, wherein said positioning motor controls a clutch control member position;
   a controller coupled to said vehicle propulsion electric motor and to said positioning motor; and
   a motor speed sensor coupled to said controller, wherein said controller is configured to automatically upshift from an under drive mode to a direct drive mode and configured to automatically downshift from said direct drive mode to said under drive mode based on a current motor speed and a set of preprogrammed shift instructions.

14. The dual ratio constant-mesh gearbox of claim 13, further comprising an output drive shaft speed sensor coupled to said controller, wherein said controller is configured to automatically upshift from said under drive mode to said direct drive mode and configured to automatically downshift from said direct drive mode to said under drive mode based on a current output drive shaft speed and said set of preprogrammed shift instructions.

15. The dual ratio constant-mesh gearbox of claim 13, further comprising a spring, wherein said spring biases said clutch member towards said first position.

16. The dual ratio constant-mesh gearbox of claim 13, wherein said dual ratio constant-mesh gearbox operates in said direct drive mode when said clutch member is located in said first position and said ring gear is locked to said sun gear, and wherein said dual ratio constant-mesh gearbox operates in said under drive mode when said clutch member is located in said second position and said ring gear is unlocked from said sun gear.

17. The dual ratio constant-mesh gearbox of claim 13, further comprising a drive mode selector switch for selecting between a plurality of selectable drive modes, wherein corresponding to each of said plurality of selectable drive modes is one of a plurality of shift instruction subsets, and wherein said set of preprogrammed shift instructions is comprised of said plurality of shift instruction subsets.

18. The dual ratio constant-mesh gearbox of claim 13, further comprising a drive mode over-ride switch, wherein activation of said drive mode over-ride switch alters said set of preprogrammed shift instructions.

19. The dual ratio constant-mesh gearbox of claim 18, wherein activation of said drive mode over-ride switch forces said dual ratio constant-mesh gearbox to remain within said direct drive mode.

20. The dual ratio constant-mesh gearbox of claim 1, further comprising:
   a clutch control member coupled to said clutch member, wherein said clutch control member translates said clutch member between said first and second positions;
   a positioning motor coupled to said clutch control member, wherein said positioning motor controls a clutch control member position;
   a controller coupled to said vehicle propulsion electric motor and to said positioning motor;
   an under drive mode selector switch, wherein said under drive mode selector switch is configured to be user selectable; and
   a direct drive mode selector switch, wherein said direct drive mode selector switch is configured to be user selectable, wherein said controller is configured to shift into an under drive mode when said under drive mode selector switch is selected, and wherein said controller is configured to shift into a direct drive mode when said direct drive mode selector switch is selected.

* * * * *